Figure 1A:
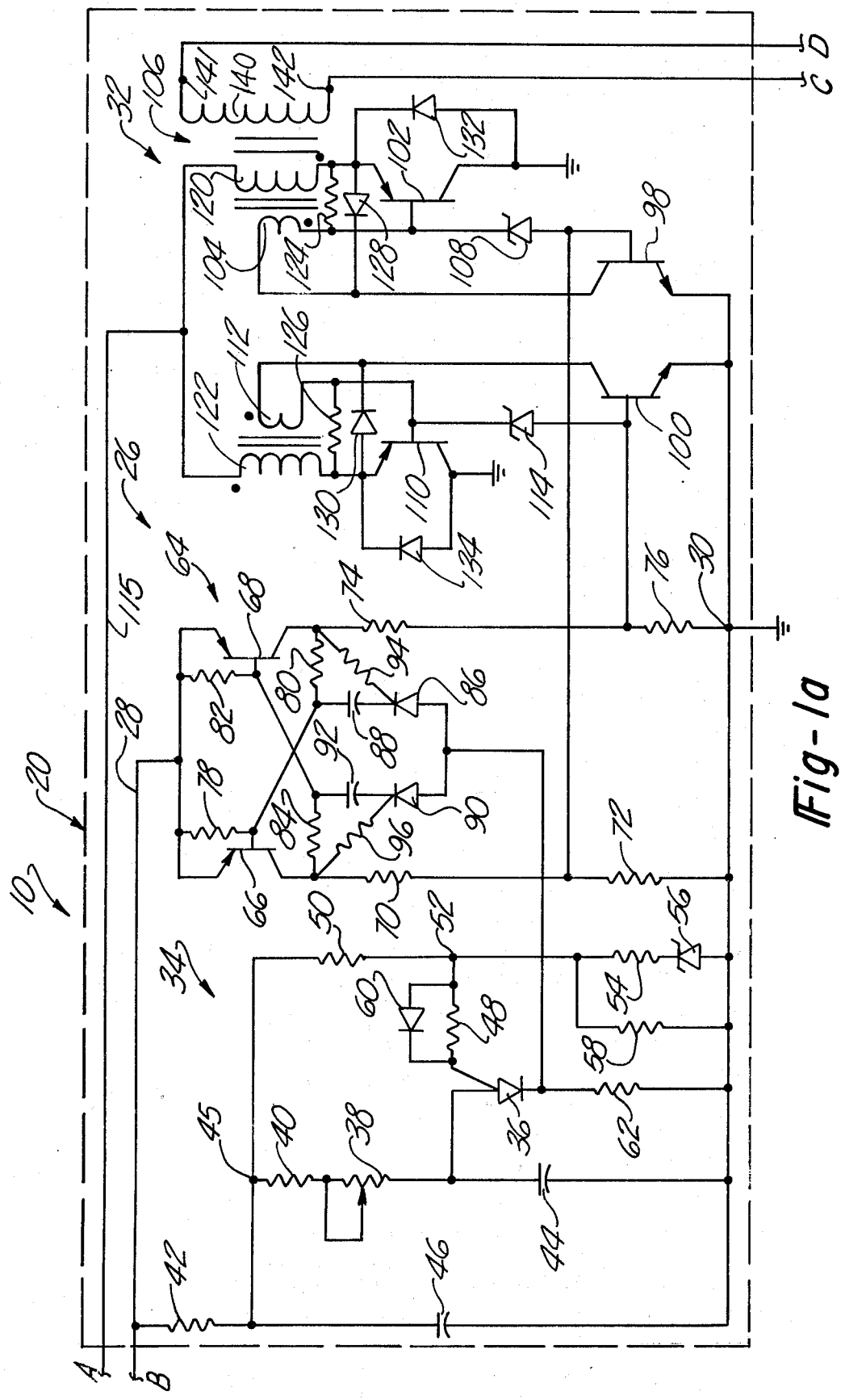

United States Patent [19]
Farr

[11] 3,974,660
[45] Aug. 17, 1976

[54] POWER SUPPLY FOR REFRIGERATION UNITS

[75] Inventor: James B. Farr, Ann Arbor, Mich.

[73] Assignee: Tecumseh Products Company, Tecumseh, Mich.

[22] Filed: July 1, 1974

[21] Appl. No.: 485,028

[52] U.S. Cl. .............................. 62/229; 62/236; 307/66; 321/21
[51] Int. Cl.² ....................... H02J 7/00; H02M 7/00
[58] Field of Search ............ 62/243, 236, 229, 230; 307/66, 64; 321/45 R, 21

[56] References Cited
UNITED STATES PATENTS

| | | | |
|---|---|---|---|
| 3,044,023 | 7/1962 | Floyd | 331/59 |
| 3,283,525 | 11/1966 | Fricke et al. | 62/236 X |
| 3,293,445 | 12/1966 | Levy | 321/45 R |
| 3,339,080 | 8/1967 | Howald | 321/45 R |
| 3,356,922 | 12/1967 | Johnston | 320/6 |
| 3,366,797 | 1/1968 | Baude | 307/66 |
| 3,382,426 | 5/1968 | Mustain | 321/21 |
| 3,389,324 | 6/1968 | Ballman | 320/25 |
| 3,419,730 | 5/1968 | Cox | 321/21 |
| 3,609,506 | 9/1971 | Frezzolini et al. | 307/66 X |
| 3,614,535 | 10/1971 | Apel | 317/40 A |
| 3,683,198 | 8/1972 | Thode | 307/66 |
| 3,774,050 | 11/1973 | Littwin | 307/66 |

*Primary Examiner*—William E. Wayner
*Attorney, Agent, or Firm*—Barnes, Kisselle, Raisch & Choate

[57] ABSTRACT

A battery powered inverter power supply for recreational vehicle refrigeration units or the like which is adapted to operate in a DC mode wherein power is supplied to the inverter and refrigeration unit from a vehicle battery, and in an AC mode wherein power is supplied to the refrigeration unit from a source of normal household power. A cold control circuit is responsive to a thermostatic sensor within the refrigerated enclosure to apply battery power to the inverter power supply only when the supply is operating in the DC mode and cooling is required. A battery charger is operable during the AC mode to automatically recharge the vehicle battery.

32 Claims, 4 Drawing Figures

POWER SUPPLY FOR REFRIGERATION UNITS

The present invention relates to refrigeration systems and, more particularly, to portable refrigeration systems for recreational vehicles or the like in which a refrigeration compressor is alternatively powered by a vehicle battery, as when the vehicle is being transported, or by a 117 VAC, 60 Hz household power source, as when the vehicle is set up in a camp site.

The invention disclosed and claimed herein is an improvement over the power supply for refrigeration units disclosed and claimed in the earlier copending application of James B. Farr, Ser. No. 389,588, filed Aug. 20, 1973, now U.S. Pat. No. 3,875,483 which application is a continuation of application Ser. No. 214,644, filed Jan. 3, 1972 (now abandoned), and which is assigned to the assignee hereof.

Portable refrigeration systems heretofore used for recreational vehicles and marine applications generally have been of gas absorption type. A practical refrigeration system of the motor-driven compressor type for recreational vehicle or marine use must be adapted to be powered from an auxiliary power source since a source of normal household power at a level of 117 VAC, 60 Hz is not always conveniently available. Such a situation may arise, for example, when a recreational vehicle, such as a camper trailer, is being transported from one camp site to another or where such a vehicle is located at a camp site at which a household power hookup is not available. Such auxiliary household power may be provided during such interim periods, for example, by a gasoline powered generator or the like. However, it will be readily apparent that such a solution is at once noisy, bulky and generally uneconomical. Accordingly, it has been heretofore recognized that a refrigeration system of this type is most conveniently powered during such interim periods by an automobile battery, a boat battery or an auxiliary battery through a power circuit which "inverts" the 12 volt DC power of the battery to the 117 VAC, 60 Hz power required by the refrigeration compressor. An inverter of this type which was specifically designed for use with portable refrigeration systems in marine and recreational vehicles is disclosed in the above-mentioned Farr application which is incorporated herein by reference. However, while the inverter power system disclosed in the above-mentioned application satisfies a significant deficiency in the portable refrigeration art, there is a commercial need for a power supply including an inverter and also having the capability to operate the compressor directly from AC power and to recharge the battery.

When a refrigeration system is powered by an automobile or boat battery as described above, there is a heavy drain on the stored energy of the battery so that such a system may be operated continuously for only a relatively short period of time, for example, on the order of 24–35 hours for a 100 amp-hour battery operating a well insulated, four cubic foot refrigerator. After this time, a refrigeration system must be connected to another power source, and the battery must be allowed to recharge. Thus when the vehicle is parked at a site at which normal household power is available, the refrigeration system should be switched from inverted battery power to the available household power. Lead acid storage batteries of the type normally used in automobiles and boats are able to recharge themselves to some extent during periods of nonoperation. However, this process of natural recharging is slow and dependent upon the age of the battery. Consequently, where it is anticipated that the refrigeration system will significantly drain the battery energy during long periods of battery powered operation, it would be highly advantageous for the inverter power supply to include a battery charger which is operable when the refrigeration system is connected to a source of household power (i.e., when the system is not being powered by the battery) and which recharges the battery to its optimum peak charge condition.

Portable refrigeration systems usually include a thermostatic cold control switch located within the refrigerated chamber and responsive to a selected temperature setting to remove power from the refrigeration compressor when the chamber temperature has dropped to a desired level. In a highly efficient, well-insulated portable refrigeration unit placed in a relatively cool location, inverted battery power may be disconnected from the refrigeration compressor more often than not. However, even when power is removed from the refrigeration compressor, the inverter power supply may drain about one amp of current from the vehicle battery. to save battery energy when the inverter power supply is operating in the DC or battery powered mode, it would, therefore, be advantageous to disable the inverter whenever the refrigerator thermostatic control indicates that cooling power is not required at the refrigeration unit.

When a refrigeration unit of the type disclosed above is powered by a source of household power, care should also be taken in grounding the unit housing to minimize the hazard of heavy AC shock. This problem is compounded when the refrigeration unit is carried by a boat or recreational vehicle since, even with the refrigerator housing connected to vehicle frame ground, the frame is almost always insulated from earth ground as by the vehicle tires, cement, etc. While manufacturers of household appliances such as refrigerators provide a three-prong power input plug on the appliance with one of the prongs being connected to the appliance housing and adapted for connection to AC or earth ground at the electrical outlet, the apppliance is all too often connected to household power through a two-prong wall outlet using a two-to-three prong adapter. Furthermore, even where the appliance is plugged into a three-prong wall outlet as intended, the outlet ground terminal may not be connected to earth ground. In either case, it will be evident that, where a recreational vehicle refrigeration system is not connected to earth ground, a shock hazard may exist. For these reasons and particularly where the refrigeration system includes an inverter power supply adapted to operate off of DC power, it is highly desirable that the DC portion of the power supply circuitry be insulated from the AC portion to minimize the possibility of connection of AC power to frame ground due to electronic or mechanical failure of the DC circuit. Furthermore, the power supply should be designed so as to minimize the hazard of AC shock even when the refrigerator housing and/or vehicle frame are not connected to earth ground or where the refrigerator plug is "flipped" before connection thereof to a source of household AC power so that the polarity of the AC input to the supply is reversed. In short, the power supply should be designed to minimize any shock hazard which may result from circuit malfunction or operator error.

Accordingly, it is a general object of the present invention to provide an economical and durable inverter power supply for use with portable refrigeration systems which is readily adaptable to a wide variety of commercial and consumer applications, and which efficiently uses the energy of the power source to which it is connected.

It is another object of the present invention to provide a power supply for refrigeration systems which is adapted to be alternatively connected to a vehicle battery or to normal household power, and which may be easily and quickly switched from one such mode of operation to the other.

It is yet another object of the present invention to provide a battery powered inverter power supply for refrigeration systems which includes a battery charging circuit that is operable when the refrigeration system is connectd to a source of normal household power to automatically recharge the battery to its predetermined optimum charge capacity.

It is a further object of the present invention to provide a battery powered inverter power supply which includes the battery charger mentioned immediately above, and which further includes a sensing circuit to sense the charge level of the battery and to inhibit operation of the battery charger when the battery charge reaches said predetermined optimum level.

It is yet another object of the present invention to provide a battery powered inverter power supply for refrigeration systems in which the inverter draws power from the battery only when cooling is required in the refrigerated enclosure.

It is yet a further object of the present invention to provide an inverter power supply for refrigeration systems which is adapted to operate from either battery or AC power, and in which the AC portion of the supply is electrically isolated from the battery or DC portion thereof.

Figure 1B:
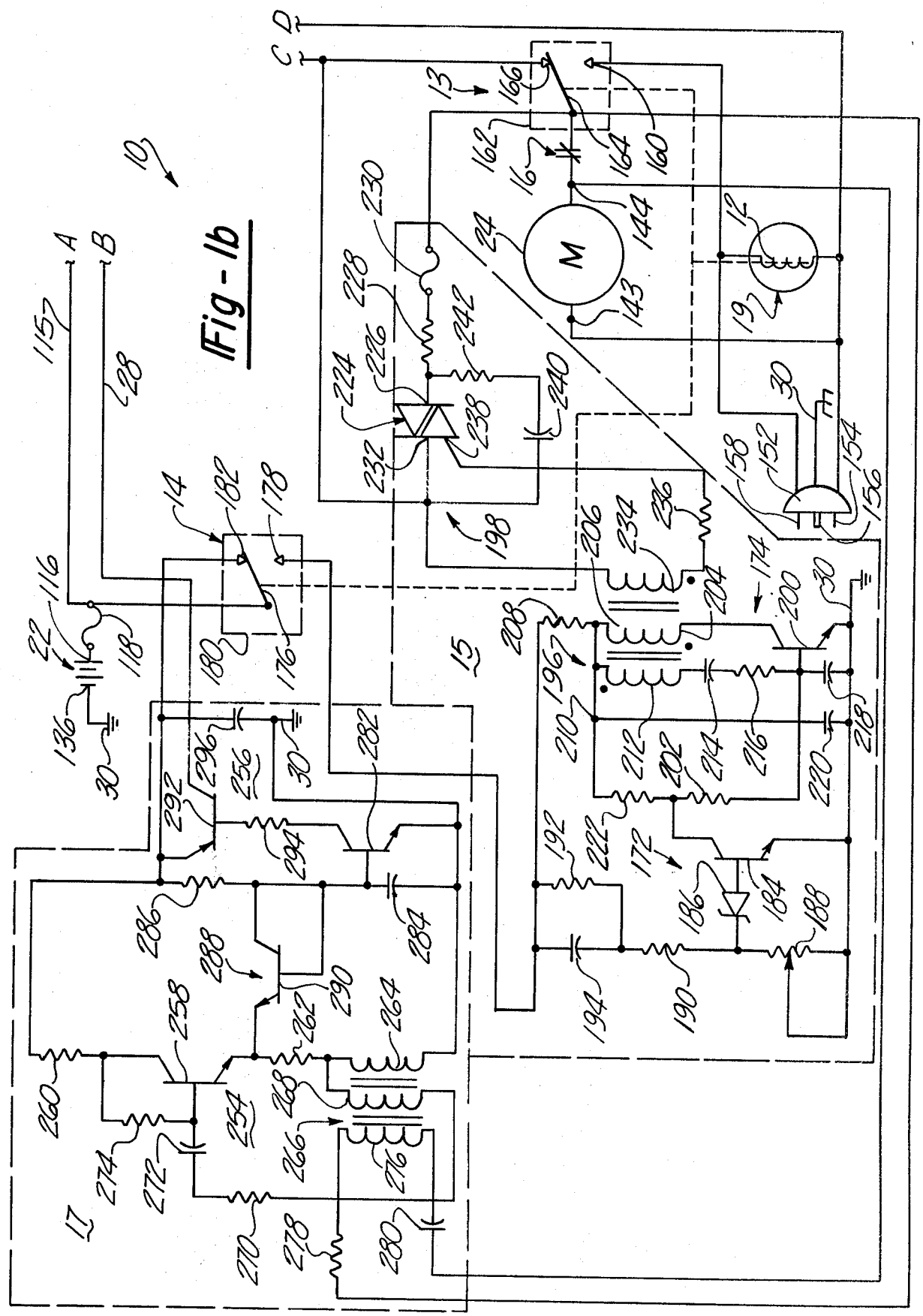
Figure 2:
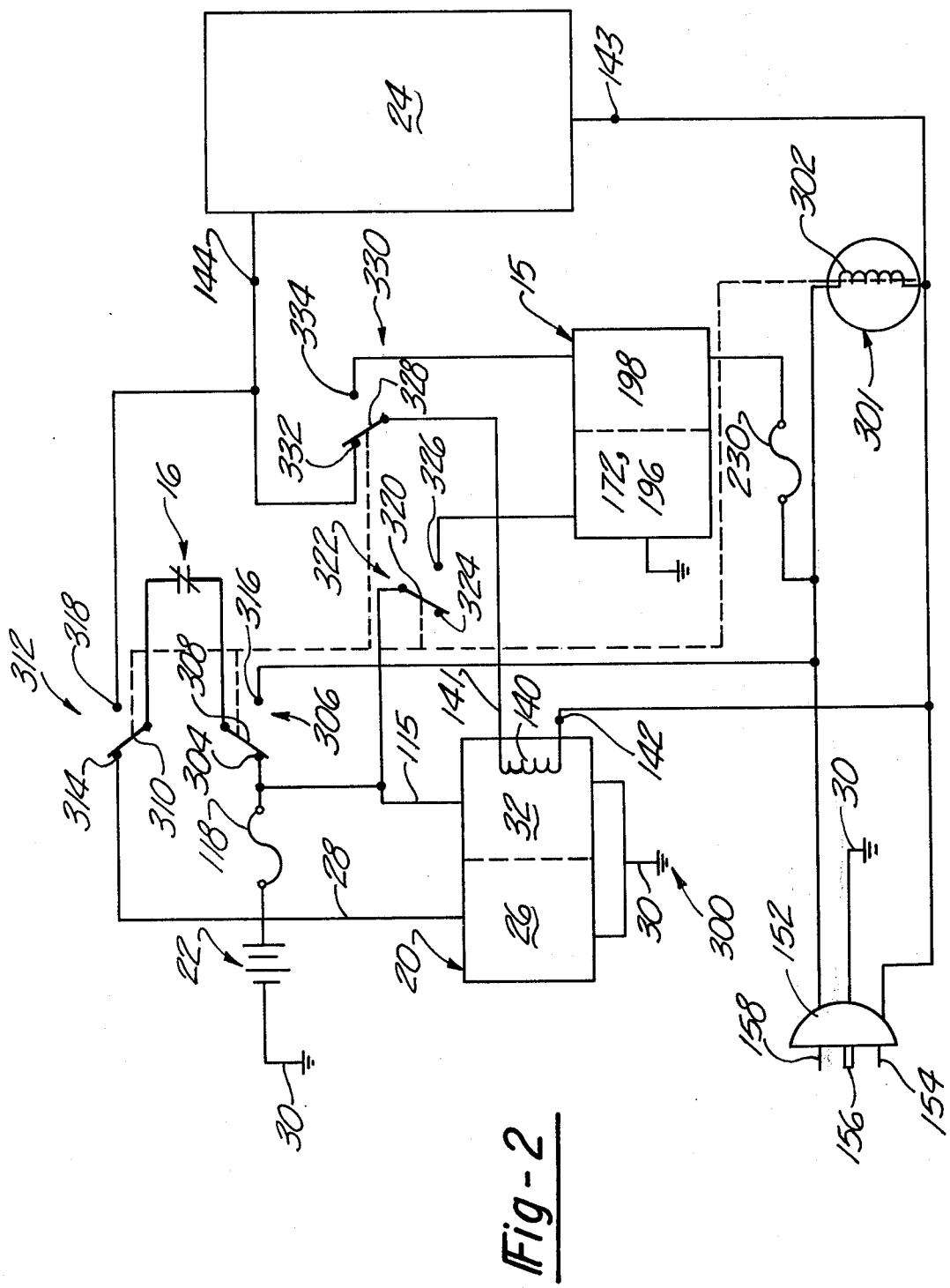
Figure 3:
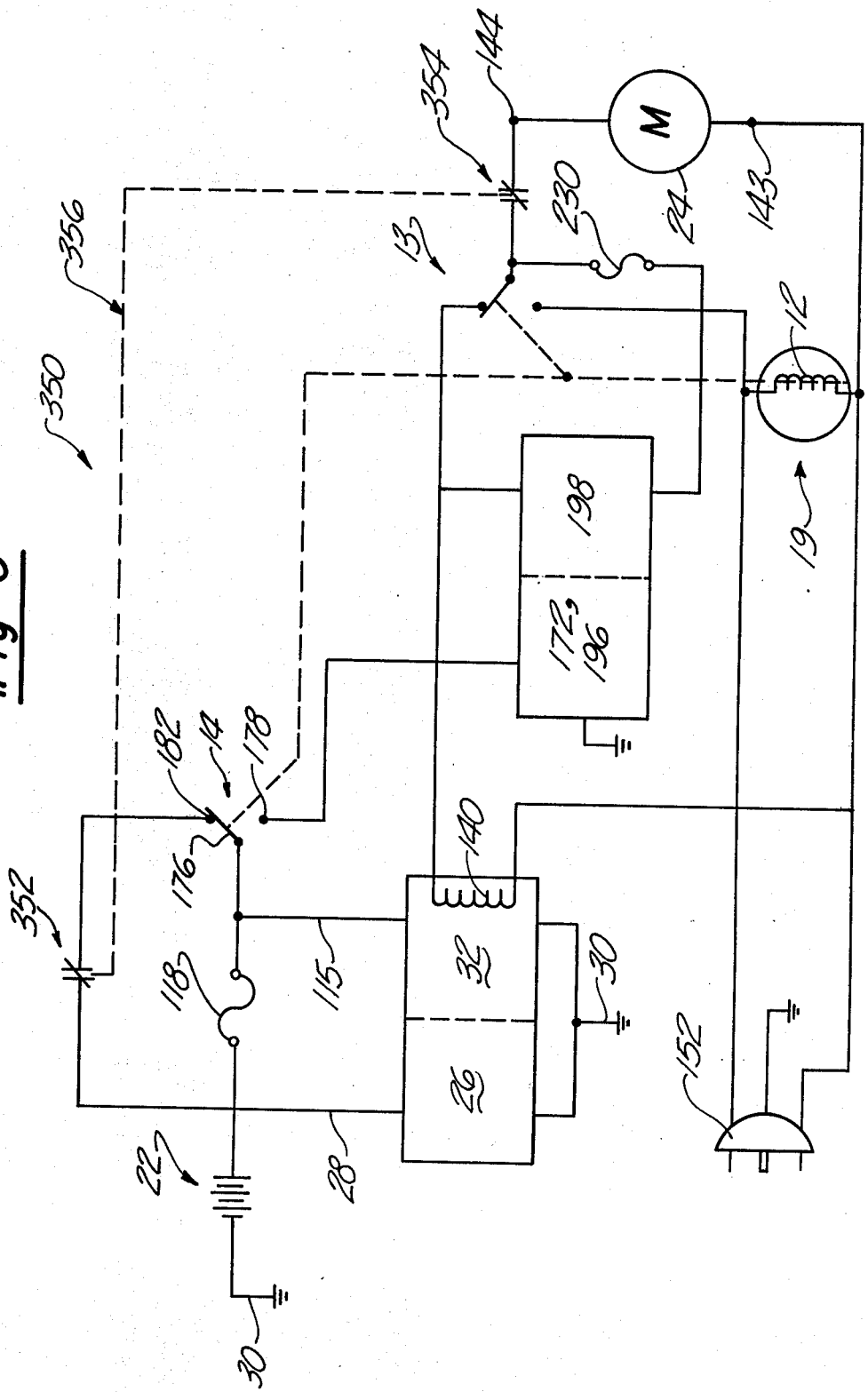

The novel features which are considered characteristic of the present invention are set forth in particular in the appended claims. The invention itself, however, together with additional objects, features and advantages thereof will be best understood from the following description when read in conjunction with the accompanying drawings in which:

FIGS. 1a and 1b are schematic diagrams which show the presently preferred embodiment of the power supply provided in accordance with the present invention;

FIG. 2 is a schematic diagram of an alternative embodiment of the power supply provided in accordance with the present invention, those portions of FIG. 2 which are identical to corresponding portions of FIG. 1 being shown in FIG. 2 in block form; and FIG. 3 is a schematic diagram of a second alternative embodiment of the power supply provided by the present invention, those portions of FIG. 3 which are identical to corresponding portions of FIGS. 1 and 2 being shown in FIG. 3 in block form.

Before discussing the details of the power supply 10 shown in FIG. 1, it would be helpful to discuss the supply in block form, relating the various features thereof to the background and objects set forth above. It will be understood that the complete circuit is formed by connecting terminals A, B, C and D in FIG. 1a to the corresponding terminals in FIG. 1b. Power supply 10 includes an inverting circuit 20 (FIG. 1a) which is adapted to "invert" the 12 VDC power of a vehicle battery 22 (FIG. 1b) to a nominal AC level of about 117 VAC, 60 Hz as required by an induction refrigeration compressor motor generally indicated at 24. Motor 24 may, for example, be a capacitor-start, capacitor-run induction motor of the type disclosed in the above-mentioned copending application and is connected to a refrigeration condenser and evaporator as shown in the above-mentioned copending application. As stated above, it is intended that the refrigeration unit of which compressor motor 24 is a part be thus operated in the battery powered or DC mode when household power is not conveniently available, as when a camper trailer is being transported from one camp site to another. However, many of the presently popular camp sites include facilities for connecting the trailer to a source of normal household power. Similarly, many marinas provide appliance hookup facilities for overnight boat travelers. Accordingly, to save battery power when such household power is readily available, power supply 10 includes an appliance power cable generally indicated at 11 which may be plugged into a conventional household power outlet and a relay generally indicated at 19 having a coil 12 to sense the presence of household power in cable 11. A first mode responsive switch 13 operated by relay coil 12 is connected to the input of motor 24 to switch the power input connection of motor 24 from the output of inverter 20 to appliance cable 11 when the cable is plugged into the household source. The motor is thus disconnected from the inverter and is operated in the household power or AC mode when household power is conveniently available.

A battery charger generally indicated at 15 has an AC input connected in parallel with the input to compressor motor 24 and a DC sensing input connected to battery 22 through a second mode responsive switch 14 operated by relay coil 12. Thus battery charger 15 is operable during the AC mode of operation to bring the charge level of battery 22 up to a predetermined optimum charge level. During the DC mode of operation, switch 14 generally connects battery 22 to the drive circuitry of inverter 20.

A thermostatic switch 16 is mounted within the refrigerated enclosure in a conventional manner and is electrically connected to the power input of compressor motor 24 to disconnect the motor from inverter 20 and cable 11 when the temperature within the refrigeration unit drops to a preselected level. During the AC mode of operation, switch 16 merely disconnects motor 24 from the external household power source. However, when switch 16 disconnects motor 24 from inverter 20 during the DC mode of operation, the inverter would continue to draw power from battery 22 in the absence of intervening control circuitry. Accordingly, a cold control circuit 17 is provided in accordance with the present invention to interrupt the flow of current from battery 22 to inverter 20 in response to activation of switch 16.

Turning now to the specific schematic details shown in FIG. 1, inverter circuit 20 of FIG. 1a includes a triggering circuit 26 connected between a DC power bus 28 and frame ground 30 and adapted to supply a series of triggering signals to an inverter output switch 32, which signals vary about a nominal frequency of substantially 60Hz in proportion to the charged level of battery 22. Triggering circuit 26 includes a programmable unijunction transistor oscillator 34 comprising a programmable unijunction transistor or, more simply, a PUT 36 having its anode connected first to voltage bus 28 through the series connected resistors 38, 40, 42 and also connected to ground 30 through capacitor 44. The junction 45 of resistors 40, 42 is also connected to ground 30 through a filter capacitor 46. The gate of PUT 36 is connected to junction 45 through the series connected resistors 48, 50. The junction 52 of resistors 48, 50 is connected to ground 30 first through the series combination of a resistor 54 and the cathode-anode junction of a Zener diode 56 and also through a resistor 58 which is connected in shunt with resistor 54 and diode 56. Junction 52 is also connected to the gate of PUT 36 through the anode-cathode junction of a diode 60. The cathode of PUT 36 which is the output of oscillator 34 is connected to ground 30 through a resistor 62. In this configuration, capacitor 44 will collect charge from bus 28 through resistors 38, 40, 42 and, when the charge has reached a predetermined maximum level, will discharge through the anode-cathode circuit of PUT 36. Resistor 38 is preferably made adjustable to allow for factory adjustment of the charge time of capacitor 44 and, hence, for adjustment of the nominal frequency of oscillator 34. Diode 60 is connected between resistor 50 and the gate of PUT 36 to lower the equivalent gate resistance at PUT turnoff, thereby allowing PUT 36 to turn off at relatively high anode currents. Conversely, the resistance of resistor 48 is preferably made quite high, as on the order of 100 K, to increase the equivalent gate resistance at PUT turn-on and thereby lower the anode threshold current of PUT 36.

Triggering circuit 26 also includes a base triggered multivibrator 64 connected to receive triggering pulses from the cathode of PUT 36 and to provide switching signals to inverter switch 32. Multivibrator 64 comprises first and second PNP transistors 66, 68 which have their emitters connected directly to bus 28 and their collectors conneted to ground 30 through the combinations of series connected resistors 70, 72 and 74, 76, respectively. The base of transistor 66 is connected to bus 28 through a resistor 78 and to the collector of transistor 68 through a resistor 80. Similarly, the base of transistor 68 is connected to bus 28 through a resistor 82 and to the collector of transistor 66 through a resistor 84. the cathode of PUT 36 is connected first to the base of transistor 66 through the anode-cathode junction of a diode 86 and thence through a capacitor 88 and also to the base of transistor 68 through a diode 90 and a capacitor 92. The cathodes of diodes 86, 90 are connected to the collectors of transistors 68, 66 through the respective resistors 94, 96.

Inverting output switch 32 includes first and second preamplifying NPN transistors 98, 100 having their bases connected to multivibrator 64 at the junctions of resistors 70, 72 and 74, 76, respectively. The emitters of transistors 98, 100 are connected directly to ground 30. The collector of transistor 98 is connected to the base of a PNP output switching transistor 102 through a secondary winding 104 of an inverter output transformer 106. The base of transistor 102 is connected to the base of transistor 98 through the cathode-anode junction of a Zener diode 108. Similarly, the collector of transistor 100 is connected to the base of a second PNP output switching transistor 110 through a secondary winding 112 and the bases of transistors 100, 110 are connected together through a Zener diode 114. The collectors of transistors 102, 110 are connected directly to ground 30 while the emitters thereof are connected through the respective primary windings 120, 122 of transformer 106, a bus 115 and a fuse 118 to the positive terminal 116 of battery 22, the negative terminal 136 of battery 22 being connected to frame ground 30. Furthermore, the emitters of transistors 102, 110 are connected to their respective bases through the resistors 124, 126, to their respective collectors through the cathode-anode junction of the diodes 132, 134, and to the collectors of transistors 98, 100 through the anode-cathode junctions of diodes 128, 130.

The output of inverter 20 appears across a secondary winding 140 of transformer 106 and is connected to compressor motor 24 (FIG. 1b) through switches 13, 16 which have already been generally mentioned and which will be discussed in greater detail hereinafter. Windings 104, 112, 120, 122, 140 are all wound on a common core of transformer 106. The combination of battery 22, inverting circuit 20 and compressor motor 24 which has been described thus far is also disclosed in detail in the above-referenced applications, particularly with reference to FIG. 4 thereof. Reference is made thereto for said detailed description. Generally, the arrangement of oscillator 34 using Zener diode 56 as a reference varies the frequency of multivibrator 64 and hence the switching frequency at transistors 102, 110 in accordance with the battery voltage. The output amplitude at winding 140 also varies with battery voltage. The frequency and amplitude variations are correlated to each other so that the waveform of the AC delivered to motor 24 has a constant volt-second product. For example, as the battery voltage decreases, the output amplitude and frequency are decreased. This arrangement has important advantages in operating the compressor motor 24 of a refrigeration system. Although inverter 20 as described herein and the corresponding inverters described in the copending Farr application are preferred, it will be understood that tthe inverter, per se, is not essential to the present invention. However, as will later be apparent, diodes 132, 134 serve a dual purpose in the inverter 20 during DC and AC operation.

Turning now to FIG. 1b, appliance power cable 11 includes a conventional three-prong plug 152 having an AC hot prong 158, an AC neutral or common prong 154 and a ground prong 156 and adapted for insertion into a conventional grounded wall socket (not shown). The hot and neutral socket receptacles (not shown) of the socket would be connected through a circuit breaker in a household junction box to the utility power lines. The ground receptacle which mates with prong 156 would be connected to earth ground by means of a cold water pipe or by direct wiring to the household junction box. However, this ground connection is sometimes not made or may not be made effectively. Plug 152 may also be connected to household power by means of a two-prong wall receptacle and a two-to-three prong adapter of the type in which the ground receptacle terminates in a pigtail which is to be connected to earth ground at the center screw of the wall socket. This ground connection is frequently ignored. Absence of a ground connection at the household wall socket has heretofore presented a shock hazard. Accordingly, the power supply provided by the present invention and shown in FIG. 1 includes several features to be discussed in detail hereinafter which virtually eliminate the danger of shock hazard regardless of the availability of an earth ground connection at the wall socket.

Relay coil 12 is connected between prongs 154, 158 to detect the presence of 117 VAC thereacross and to switch mode responsive switches 13, 14 as described above. Neutral prong 154 and a terminal 141 of output winding 140 (FIG. 1a) are connected together at a first input terminal 143 of motor 24. Mode responsive switch 13 includes a first contact set 162 having a normally open contact 160 connected to AC hot prong 158, a normally closed contact 166 connected to a second terminal 142 of inverter output winding 140 (FIG. 1a) and a common movable contact 164 connected through normally closed thermostatic switch 16 to a second motor input terminal 144. Thus switch 13 connects motor 24 to output winding 140 when power supply 10 is operating in the DC mode (i.e., when AC household power is not sensed by relay coil 12) and connects motor 24 directly across the household power input lines when power supply 10 is operating in the AC mode (i.e., when plug 152 is inserted into a hot wall socket and coil 12 senses the presence of household power between prongs 154 and 158). Ground prong 156 is connected to frame ground 30.

Power supply 10 further includes a battery charger comprising a charge regulator 172 connected to battery 22 through mode responsive switch 14 to sense the charge level of the battery and a triggering circuit 174 responsive to regulator 172 to gate rectified battery charging pulses to the battery when the sensed charge level thereof is below a predetermined optimum level. Mode responsive switch 14 includes a contact set 180 having a normally closed contact 182 generally connected to triggering circuit 26 (FIG. 1a) through cold control circuit 17, a common contact 176 connected to positive terminal 116 of battery 22, and a normally open contact 178 connected to battery charger 15. Thus mode responsive switch 14 applies battery power to triggering circuit 26 through cold control circuit 17 when power supply 10 is in the DC mode of operation and connects the battery to battery charger 15 when power supply 10 is in the AC mode of operation. It should be noted, however, that battery 22 remains connected to inverter switch 32 (FIG. 1a) via line 115 irregardless of the mode of operation of the power supply. The significance of this fact will be discussed in detail hereinafter.

It will also be noted that switch 14 removes battery power from triggering circuit 26 during the AC mode of operation. Furthermore, it will be apparent from FIG. 1a and the above discussion thereof that the various transistors 98, 100, 102, 110 of inverter output switch 32 will not conduct current when power is removed from circuit 26. Thus mode responsive switch 14 insures that inverter 20 is not energized when the power supply is operating in the AC mode.

Charge regulator 172 includes an NPN transistor 184 which has its emitter connected directly to ground 30 and its base connected to ground through the anode-cathode junction of a Zener diode 186 and thence through a resistor 188 to ground 30. The cathode of diode 186 is also connected through the series connected resistors 190, 192 to relay contact 178. A capacitor 194 is connected between resistor 190 and contact 178 in parallel with resistor 192. Resistor 188 is preferably made adjustable to allow for factory adjustment of regulator 172 to match a desired optimum charge level for battery 22.

Triggering circuit 174 comprises a high frequency blocking oscillator 196 responsive to the battery charge level sensed by regulator 172 to supply a series of triggering pulses to an electronic switch 198 when the sensed battery charge level falls below the optimum level. Oscillator 196 includes an NPN oscillating transistor 200 which has its emitter connected directly to ground 30 and its base connected to the collector of transistor 184 through a resistor 202. The base of transistor 200 is also connected to ground 30 through a noise suppression capacitor 218. The collector of transistor 200 is connected through a first winding 204 of a transformer 206 and thence through a resistor 208 to contact 178. The junction 210 of resistor 208 and winding 204 is connected back to the base of transistor 200 through the series combination of a second winding 212 of transformer 206, a blocking capacitor 214 and a resistor 216. Junction 210 is further connected to ground 30 through a filter capacitor 220 and to the collector of transistor 184 through a resistor 222. The connection of collector of transistor 184 to the junction of resistors 202, 222 (rather than directly to the base of transistor 200) does not introduce any appreciable shift in frequency of oscillator 174 as a function of the conductivity of transistor 184. Electronic switch 198 includes a triac 224 having a first terminal 226 connected through a resistor 228 and a fuse 230 to common contact 164 of switch 13 and having a second terminal 232 connected to terminal 142 of transformer 106 (FIG. 1a). A triggering circuit comprising a third winding 234 of transformer 206 and a resistor 236 is connected in series between triac terminal 232 and the triac gate 238. A capacitor 240 and a resistor 242 are connected in series between triac terminals 232, 226 to prevent the triac from overheating should the battery become disconnected while charger 15 is operating.

When power supply 10 is operating in the AC mode, a voltage appears across resistor 188 at the cathode of diode 186 which is proportional to the charge level or voltage on battery 22. Resistor 188 is to be factory adjusted such that, when the charge level of battery 22 is at its optimum level, the voltage across resistor 188 is sufficient to cause reverse breakdown of Zener 186 and conduction of transistor 184, thereby turning off oscillator 196. Conversely, when the voltage across resistor 188 is below this Zener breakdown level indicating that the charge on battery 22 is below the optimum level, transistor 200 is allowed to oscillate, preferably at about 5 KHz, and triggering pulses are supplied to triac 224 through transformer 206. Oscillator 196 is a blocking oscillator in which the collector-emitter conductive path of transistor 200 is coupled to the base thereof by transformer windings 204, 212. Resistor 208 and capacitor 220 effectively isolate power junction 210 from regulator 172 so that the high frequency oscillations of transistor 200 will not adversely affect the operation of regulator 172 in sensing the charge level of battery 22.

Oscillations of oscillator 196 produce high frequency triggering signals at triac gate 238 so that the triac is triggered at a rate of about 5 KHz. The triggering frequency is much higher than the frequency of the AC line so that the triac 224 will conduct early in each AC half cycle. It is to be noted that transformer windings 204, 234 are poled such that decreasing current in the collector-emitter path of transistor 200 causes a triggering signal that is positive from triac gate 238 to triac terminal 232 which is the most sensitive triac triggering polarity. When connected in this fashion, electronic switch 174 will provide battery recharging pulses to battery 22 even when the battery voltage sensed by regulator 172 and supplied to oscillator 196 at junction 210 is as low as one volt.

When triac 224 is conductive, household power at about 117 VAC, 60 Hz appears across winding 140 of transformer 106 (FIG. 1a). With winding 140 now acting as a primary winding, this AC voltage is stepped down to a battery charging level by secondary windings 120, 122, full-wave rectified by diodes 132, 134 and supplied to battery 22 via line 115 to charge the battery. Thus in the power supply provided by the present invention, transformer 106 serves the dual purpose of providing an output transformer for inverter 20 when power supply 10 is operating in the DC mode to step up the inverter output voltage to a level of about 117 VAC as required by compressor motor 24, and of providing a step down transformer for battery charger 15 when the power supply is operating in the AC mode. As set forth more fully in the copending Farr application, when operating in the DC mode, diodes 132, 134 provide for inductive feedback to battery 22. For example, when transistor 110 turns off, the flux developed in the core of transformer 106 due to current flow in winding 122 cannot change instantaneously; and so current now flows in winding 120 through diode 132 back to battery 22. Hence dioes 132, 134 serve the dual purpose of providing inductive energy feedback to battery 22 when supply 10 is operating in the DC mode and of providing full-wave rectification for the stepped down battery charging voltage when the supply is operating in the AC mode. It will be recalled that battery power is disconnected from triggering circuit 64 and transistors 98, 100, 102, 110 are turned off when the supply is operating in the AC mode.

Returning now to regulator 172 (FIG. 1b), a positive-going battery recharging pulse appearing at battery 22 also appears across resistor 188 of the regulator and, to the extent that the pulse exceeds the steady state potential of the battery, turns on transistor 184 to shut off the oscillator. In the meantime, current from the charging pulse peak causes charge to accumulate on capacitor 194. At the end of the pulse peak, i.e., when the voltage of the recharging pulse drops below the steady state potential of battery 22, the voltage seen at the cathode of Zener 186 is equal to the partially recharged steady state voltage of battery 22 minus the voltage now appearing on capacitor 194 due to the charge accumulated thereon, which capacitor voltage will gradually discharge primarily through resistor 192. The voltage accumulated on and discharged from capacitor 194 remains substantially constant from one battery charging pulse to another. However, as the battery itself recharges, the composite voltage seen at the cathode of Zener 186 rises so that eventually the steady state battery potential will be great enough to overcome the subtraction effect of capacitor 194, and transistor 184 will conduct to inhibit further triggering of triac 224. Stated differently, when the steady state recharged battery voltage minus the decaying voltage on capacitor 194 is greater than the reverse breakdown voltage of Zener 186 plus the base-emitter drop of transistor 184, transistor 184 will conduct to inhibit triac triggering. Capacitor 194 thus provides a charging window during which recharging pulses are supplied to the battery to raise the charge level thereof from a first predetermined lower potential to a second predetermined higher potential. The battery then has a discharging window during which the charge level is allowed to dissipate through a load from the second level down to the first. This has the salutary effect of spacing the large transient currents associated with the initial excitation of transformer 106 over a relatively long time interval so that triac 224 will not overheat. The time duration of the charging and discharging windows depends, among other things upon the battery load. In the preferred embodiment of the present invention, the predetermined lower charge level of battery 22 is at a potential of about 14.0 volts, and the second higher potential is at a level of about 14.2 volts.

Referring again to FIG. 1b, cold control circuit 17 is responsive to the condition of thermostatic switch 16 to selectively apply power from battery 22 to triggering circuit 26 of inverter 20 and to thereby prevent the inverter circuit from draining the charge from battery 22 when supply 10 is operating in the DC mode but cooling power is not required at the refrigerator. Cold control circuit 17 comprises a blocking oscillator 254 electrically coupled to switch 16 and an electronic switch 256 electrically connected between battery 22 and inverting circuit 20. Oscillator 254 is arranged to turn switch 256 off to thereby disconnect battery power from the drive circuitry of the inverting circuit when switch 16 is open and thence cooling power is not required. Oscillator 254 includes an NPN transistor 258 which has its collector connected through a resistor 260 to contact 182 of switch 14. Battery power is thus applied to control circuit 17 only during the DC mode of supply operation. The emitter of transistor 258 is connected through a resistor 262 and thence through a first winding 264 of a transformer 266 to ground 30. The emitter of transistor 258 is also connected to the base thereof through resistor 262 and thence through the series combination of a second transformer winding 268 of transformer 266, a resistor 270 and a DC blocking capacitor 272. The base of transistor 258 is also connected to the collector thereof through a resistor 274 so that transistor 258 is continually biased in the active region.

A third winding 276 of transformer 266 is loop connected with switch 16 through a resistor 278 and a capacitor 280. The combined series impedance of resistor 278 and capacitor 280 is empirically chosen such that the composite loop connected to winding 276 absorbs substantially all of the energy of transformer 266 and inhibits operation of oscillator 254 when the contacts of switch 16 are closed. However, with switch 16 closed, transistor 258 will be conducting even though it is not oscillating. Conversely, when the contacts of switch 16 are open, winding 276 has no effect upon the transformer energy so that blocking oscillator 254 will oscillate in the usual manner.

Switch 256 includes an NPN transistor 282 having its emitter connected directly to ground 30 and its base connected to ground through a capacitor 284. The base of transistor 282 is also connected to contact 182 through a resistor 286 and to the emitter of transistor 258 through a rectifier 288. Rectifier 288 preferably comprises an NPN transistor 290 which has its base and collector connected to the base of transistor 282 and its emitter connected to thee emitter of transistor 258. When thus connected, the emitter-base reverse Zener breakdown voltage of transistor 290 clamps any inductive kickback in winding 264 caused by the opening of switch 16, thereby protecting oscillator 254 and switch 256 from inductive kickback overload. Furthermore, with the base and collector of transistor 290 connected together at the high voltage side of rectifier 288, transistor 290 provides a more efficient high frequency rectifier than either a Zener diode or an ordinary silicon diode. The collector of transistor 282 is connected to the base of a PNP switching transistor 292 through a resistor 294. The emitter of transistor 292 is connected directly to contact 182 and to ground 30 through a filter capacitor 296 while the collector thereof is connected to voltage bus 28 and thence to triggering circuit 26 of inverter 20.

In the operation of cold control circuit 17 in the DC mode, oscillation of oscillator 254 is inhibited in the manner described above when thermostatic switch 16 is closed, indicating that cooling is required in the refrigeration chamber. However, transistor 258 will be on so that rectifier 288 is reverse biased and current is supplied from battery 22 through resistor 286 to capacitor 284 at the base of transistor 282. Transistor 282 turns on pulling current into its collector through the emitter-base junction of transistor 292. Transistor 292 is, therefore, turned on to connect battery 22 to triggering circuit 26 (FIG. 1a). When switch 16 opens, indicating that cooling power is no longer required at the refrigeration chamber, oscillator 254 begins to operate and transistor 258 turns alternatively on and off. Each time transistor 258 turns off, the magnetic flux stored in transformer coil 264 forward biases rectifier 288 and discharges capacitor 284 to ground through the coil and resistor 262. The values of resistors 286, 262 and of capacitor 284 are chosen such that the voltage on capacitor 284 when oscillator 254 is operating is insufficient to turn on transistor 282. In this manner, transistor 292 is turned off and the battery is disconnected from triggering circuit 26. Furthermore, the value of capacitor 284 is preferably chosen to be relatively high, as on the order of two microfarads, to inhibit spurious conduction of transistor 282 which may be induced, for example, by noise appearing on the relatively long leads to switch 16.

The preferred embodiment of the present invention which has been described in detail hereinabove with respect to FIG. 1 includes several advantageous features which may not necessarily be self-evident from an examination of the circuitry. For example, one would usually assume that a potential shock hazard will exist whenever frame ground is disconnected from AC earth ground. Such a circumstance may result from faulty wiring of the household outlet to which the appliance power cable is connected or from plugging the cable into the outlet using a two-to-three prong adapter as discussed above. With frame ground thus floating, any circuit failure which causes a short circuit condition between AC power and frame ground would place 117 VAC directly onto the vehicle frame and present a serious shock hazard to anyone who may touch the vehicle. However, power supply 10 shown in FIG. 1 has been specifically designed to minimize any danger of shock hazard which would otherwise result from circuit component failure or from operator error, negligence or inadvertence.

Referring to FIG. 1, and specifically to FIG. 1b, it will be noted, for example, that relay contact set 162 of mode responsive switch 13 is connected only to the AC components of supply 10, i.e., to appliance cable 11, compressor motor 24 and inverter output winding 140. Thus if contact set 162 fails, for example, contact 160 "arcs over" to contacts 164 and 166, the resulting connection of household power to the AC components will not cause component failure or a shock hazard. Similarly, contact set 180 of mode responsive switch 14 is connected only to the DC components of supply 10, i.e., to cold control circuit 17, sensing circuit 172, inverter 20 and battery 22. Even if arc-over should occur between contacts 178, 180 and 182, which is highly unlikely because of the low level DC voltage involved, such DC voltage would be connected only to DC circuit components so that circuit failure and/or shock hazard will not result. In the preferred embodiment of the present invention, relay contact sets 162, 180 are physically separated by about ¾ inch to minimize the possibility of arc-over between sets.

Furthermore, it will be noted from FIGS. 1a and 1b at each interface between AC-carrying circuits and DC-carrying circuits, the respective circuits are separated by a transformer to electrically isolate the DC circuits from the AC power circuits. Thus transformer 106 electrically isolates the DC portion of inverter 20 from compressor motor 24 and appliance power cable 11. Similarly, transformer 206 isolates AC switching triac 224 from triggering oscillator 196 and sensing circuit 172, and transformer 266 isolates AC switching thermostat 16 from cold control oscillator 254. As a result of the physical separation of relay contact sets 162, 180 as discussed immediately above, and as a result of the further provision of transformer isolation between the AC- and DC-carrying circuits of power supply 10, the possibility of a high leakage current between 117 VAC and frame ground 30 will be eliminated except in the unlikely event that the insulation between transformer windings breaks down or a conducting path is formed across adjacent AC and DC circuit board conductors. Circuit boards are coated to prevent such bridging. Even if either of these two faults does occur, grounding wire 156 provides a further safeguard against electrical shock. Transformer isolation also protects DC circuit components against burnout which might otherwise occur due to leakage from the AC circuits to the DC circuits. Furthermore, it will be noted with respect to the preferred embodiment shown in FIG. 1 that plug 152 may be flipped; i.e., prongs 158 and 154 may be reversed without adversely affecting either the operation or the safety of power supply 10.

As mentioned briefly above, it will be further noted with respect to FIG. 1 that cold control circuit 17 and/or mode responsive switch 14 disconnect battery power from triggering circuit 26 and not from the entire inverter 20. However, the provision of a separate connection 115 between the center tap of transformer primary 120, 122 yields several significant advantages which are important to the overall operation of power supply 10. For example, it will be evident from the discussion above relative to battery charger 15 that transformer 106 must remain connected to battery 22 during the AC operating mode to supply battery charging pulses thereto. Furthermore, where the refrigeration unit includes a compressor motor of the induction type which is susceptible to relatively high locked-rotor currents, any switching means connected between the inverter transformer and the battery, be it a transistor or a relay switch, must have a relatively high transient current rating to withstand this high locked-rotor current. Thus by providing an inverter output stage 32 which is nonconductive in the absence of switching signals at its input, a control circuit 17 and a switch 14, both of which have relatively low current carrying capacities, may be connected between battery 22 and inverter triggering stage 26 to selectively disable the entire inverter 20.

A modified power supply 300 is shown in detail in FIG. 2 in which sections thereof identical to corresponding sections of the preferred embodiment 10 of FIG. 1 are shown in block form and are assigned reference numerals identical to those indicated in FIG. 1. Referring to FIG. 2, AC/DC mode relay 301 comprises a relay coil 302 connected across AC hot and neutral prongs 158, 154 of appliance cable plug 152 to sense AC voltage thereacross when plug 152 is inserted into a conventional household receptacle. Battery 22 is connected through fuse 118 first to inverter output switch 32 via conductor 115 and also to a normally closed contact 304 of a first mode responsive relay switch 306 operated by relay coil 302. The common contact 308 of switch 306 is connected through thermostatic switch 16 to the common contact 310 of a second mode responsive relay switch 312 also operated by relay coil 302. Switch 312 has its normally closed contact 314 connected to power bus 28 of triggering circuit 26. Thus when power supply 300 is in the DC operating mode, switches 306, 312 are in their normally closed positions and power is supplied to triggering circuit 26, and hence to inverter 20 generally, through switches 306, 312 and through thermostatic switch 16 directly. This is to be contrasted with the embodiment shown in FIG. 1 wherein a separate cold control circuit 17 is connected between battery 22 and inverter 20 and is responsive to thermostat 16 to disconnect the inverter from battery power.

Mode responsive switch 306 also includes a normally open contact 316 which is connected directly to AC hot prong 158. Similarly, switch 312 includes a normally open contact 318 which is connected directly to terminal 144 of compressor motor 24. Thus when power supply 300 is operating in the AC mode, switches 306, 312 not only effectively disconnect battery 22 from inverter 20 but also connect AC hot prong 158 to compressor motor 24 via contacts 316, 308, thermostatic switch 16 and contacts 310, 318. It will be noted that AC neutral prong 154 is connected directly to motor terminal 143 as was the case with FIG. 1 above. Battery 22 is connected through fuse 118 to the common contact 320 of a third mode responsive relay switch 322 operated by relay coil 302. The normally closed contact 324 of switch 322 is not connected in the circuit while the normally open contact 326 thereof is connected to regulator 172 of battery charger 15. Thus battery power is supplied to regulator 172 only when power supply 300 is operating in the AC mode.

Terminal 141 of inverter output transformer coil 140 is connected to the common contact 328 of a fourth mode responsive relay switch 330 operated by coil 302. Switch 330 has its normally closed contact 332 connected to terminal 144 of motor 24 and its normally open contact 334 connected to switch 198 of battery charger 15. Thus when power supply 300 is operating in the DC mode, the output of inverter 20 is supplied to motor 24 through contacts 328, 332 of mode responsive switch 330. However, when supply 300 is switched to the AC operating mode, inverter coil 140 is connected across the AC input line through battery charging switch 198 and contacts 328, 334 of switch 330 so that battery 22 can be charged in the manner previously described in connection with FIG. 1.

The remaining circuit details of power supply 300 of FIG. 2 are substantially identical to those described in detail above with respect to FIG. 1. Similarly, the operating details of supply 300 not specifically hereinabove discussed will be self-evident with reference to the detailed discussion of FIG. 1. Although the power supplies 10 and 300 have certain similarities, the power supply 10 of FIGS. 1a and 1b is much preferred due to its more complete AC-DC isolation and reduced shock hazard. Additionally, the relay 19 (FIG. 1b) having two contact sets 162, 180 is more economical than the relay 301 (FIG. 2) having four contact sets.

A second modified power supply 350 is shown in detail in FIG. 3 in which sections thereof identical to corresponding sections of the embodiments of FIGS. 1 and 2 are shown in block form and are assigned reference numbers identical to those indicated for the earlier figures. Referring to FIG. 3, power supply 350 shown therein is substantially identical to supply 10 of FIG. 1 except that the thermostatic switch 16 (FIG. 1b) is replaced by a thermostatic switch 356 (FIG. 3) having two normally closed contact sets 352, 354 and the cold control circuit 17 of FIG. 1b is replaced by contact set 352 (FIG. 3) connected between contact 182 of mode responsive switch 14 and bus 28 of triggering circuit 26. Contact set 352 is thermally actuated (along with contact set 354) in response to the temperature within the refrigerated enclosure to disconnect the triggering circuit 26 from battery 22 when cooling power is not required in the refrigerated enclosure. The other contact set 354 of switch 356 is connected between mode responsive switch 13 and motor 24 in the manner of switch 16 of FIG. 1b.

It will be apparent with reference to FIG. 3 that if the contact set 352 is electrically isolated from set 354, as by adequate physical separation or by electrical insulating material between the respective contact sets, power supply 350 (FIG. 3) includes all of the AC/DC isolation advantages discussed in detail above with reference to FIG. 1. Furthermore, these several advantages are achieved at a potentially lower power supply cost since the several components of circuit 17 (FIG. 1b) are replaced by a single contact set 352 (FIG. 3). However, according to present industry practice, portable refrigeration units presently commercially available include a factory-installed single pole thermostatic switch such as that indicated at 16 (FIG. 1b). Because of this industry practice, power supply 10 of FIG. 1 is presently preferred, although the power supply 350 (FIG. 3) is potentially less expensive and indeed may be preferred in the future.

From the foregoing description, it will now be apparent that the power supply for refrigeration systems which has been provided in accordance with the present invention fully satisfies the objects, aims and advantages set forth above. While the invention has been described in conjunction with three specific embodiments thereof, it will be evident that many alternatives, modifications and variations will be apparent to those skilled in the art in view of the foregoing description. Accordingly, the invention is intended to embrace all such modifications and variations as fall within the spirit and broad scope of the appended claims.

I claim:

1. In a refrigeration system, the combination comprising a refrigeration unit having a refrigerated enclosure and a compressor driven by an AC motor, a battery, inverter circuit means responsive to connection to said battery to supply first AC power to said motor, connection means for connection to a source of second AC power, first switch means operatively connected to said AC power connection means, said inverter circuit means and said motor, said first switch means having a first switch position for connecting said compressor motor to said inverter circuit means and a second switch position for connecting said compressor motor to said AC power connection means, battery charging means electrically connected to said AC power connection means and adapted to be responsive to said second AC power to provide a series of pulses for charging said battery, second switch means operable in unison with said first switch means and having third and fourth switch positions corresponding to said first and second switch positions of said first switch means, said third switch position of said second switch means being arranged to connect said battery to said inverter circuit means to enable said inverter circuit means, said fourth switch position being arranged to connect said battery to said battery charging means to enable said battery charging means according to the charge on said battery, and third switch means responsive to a predetermined condition of said refrigeration unit to remove power from said compressor motor regardless of the switch positions of said first and second switch means.

2. The combination set forth in claim 1 further comprising sensing means electrically coupled to said AC power connection means to sense connection of said AC power connection means to said source, said sensing means being in a first condition when said AC power connection means is disconnected from said source and in a second condition when said AC power connection means is connected to said source, and wherein said first and second switch means are operatively connected to said sensing means such that said first and second switch means are in said first and third switch positions, respectively, when said sensing means is in said first condition and in said second and fourth switch positions, respectively, when said sensing means is in said second condition.

3. The combination set forth in claim 1 wherein said inverter circuit means includes reactive output coupling means electrically isolating said inverter circuit means against direct electrical conduction between said inverter circuit means and said AC power connection means and against direct electrical conduction between said inverter circuit means and said compressor motor.

4. The combination set forth in claim 3 wherein said battery charging means includes reactive coupling means electrically isolating said battery charging means against direct electrical conduction between said battery charging means and said AC power connection means and against direct electrical conduction between said battery charging means and said compressor motor.

5. The combination set forth in claim 4 wherein said third switch means is responsive to the temperature within said refrigerated enclosure to remove power from said compressor motor when said temperature falls below a predetermined level.

6. The combination set forth in claim 5 wherein said third switch means comprises fourth and fifth switch means, said fourth switch means being electrically connected between said first switch means and said compressor motor and responsive to said temperature to disconnect said first switch means from said motor, and fifth switch means being operable to disconnect said battery from said inverter circuit means when said first switch means is disconnected from said motor by said fourth switch means.

7. The combination set forth in claim 6 wherein said fourth and said fifth switch means comprise respective sets of thermally actuated contacts.

8. The combination set forth in claim 6 wherein said fourth switch means comprises thermally actuated contacts, said fifth switch means comprises electronic switch means operable in response to operation of said contacts and wherein said electronic switch means is coupled to said contacts through reactive coupling means such that said electronic switch means is electrically isolated against direct electrical conduction between said electronic switch means and said AC power connection means and against direct electrical conduction between said electronic switch means and said compressor motor.

9. The combination set forth in claim 8 wherein said fifth switch means includes an oscillator circuit having inductive feedback circuit means and wherein said reactive coupling means is inductively coupled in said inductive feedback circuit to control said oscillator circuit according to said thermally actuated contacts.

10. The combination set forth in claim 1 wherein said first and said second switch means are respective first and second contact sets of a relay and said relay includes a coil to operate said contact sets in response to AC power when said connecting means is connected to said source.

11. The combination set forth in claim 1 wherein said third switch means comprises fourth and fifth switch means, said fourth switch means being electrically connected between said first switch means and said compressor motor and responsive to said condition to disconnect said first switch means from said motor, and fifth switch means being operable to disconnect said battery from said inverter circuit means when said first switch means is disconnected from said motor by said fourth switch means.

12. The combination set forth in claim 11 wherein said fourth and said fifth switch means comprise respective sets of thermally actuated contacts.

13. The combination set forth in claim 11 wherein said fourth switch means comprises thermally actuated contacts, said fifth switch means comprises electronic switch means operable in response to operation of said contacts and wherein said electronic switch means is coupled to said contacts through reactive coupling means such that said electronic switch means is electrically isolated against direct electrical conduction between said electronic switch means and said AC power connection means and against direct electrical conduction between said electronic switch means and said compressor motor.

14. The combination set forth in claim 13 wherein said fifth switch means includes an oscillator circuit having inductive feedback circuit means and wherein said reactive coupling means is inductively coupled in said inductive feedback circuit to control said oscillator circuit according to said thermally actuated contacts.

15. The combination set forth in claim 1 wherein said inverter circuit means comprises triggering circuit means responsive to connection to said battery to supply a periodic series of triggering signals and inverter switching means directly connected to said battery and responsive to said triggering signals to provide said first AC power to said motor, said inverter switching means drawing substantially no power from said battery in the absence of said triggering signals, and wherein said third switch means includes a switch connected between said battery and said triggering circuit means and operable in response to said predetermined condition of said refrigeration system to disconnect said battery from said triggering circuit means.

16. In a refrigeration system, the combination comprising a refrigeration unit having a refrigerated enclosure and a compressor driven by an AC induction motor, a source of DC power, inverter circuit means including triggering circuit means responsive to connection to said DC power source to supply a series of periodic triggering signals and inverter switching means operatively connected to said DC power source and responsive to said triggering signals to provide AC power to said induction motor, said inverter switching means drawing substantially no power from said DC power source in the absence of said triggering signals, and control circuit means operatively connecting said DC power source to said triggering circuit means and responsive to a predetermined condition of said refrigeration system to disconnect said DC power source from said triggering circuit means, said control circuit means comprising first switching means having a conductive condition responsive to said predetermined condition of said refrigeration system, a control circuit operatively connected to said first switching means to supply a control signal in response to the conductive condition of said first switching means, and second switching means comprising a first electronic switch having first and second electrodes electrically connecting said DC power source and to said triggering circuit means and a control electrode responsive to said control signal to change the conductive condition of said first electronic switch.

17. The combination set forth in claim 16 wherein said control circuit is coupled to said first switching means through reactive coupling means such that said control circuit means is electrically isolated from direct electrical conduction between said control circuit means and said first switching means and from direct electrical conduction between said control circuit means and said compressor motor.

18. The combination set forth in claim 17 wherein said control circuit comprises an oscillator circuit connected to said DC power source and responsive to said conductive condition of said first switching means to generate an oscillatory signal in the absence of said predetermined condition, and detection circuit means electrically connected to said oscillator to provide said control signal in response to said oscillatory signal.

19. The combination set forth in claim 18 wherein said oscillator comprises an electronic switch having first and second main electrodes and a control electrode for controlling conduction between said main electrodes, and wherein said coupling means comprises a transformer having a first winding connecting one of said main electrodes to said DC power source, a second winding magnetically coupled to said first winding and electrically coupled to said control electrode, the magnetic coupling between said first and second windings causing said oscillator to generate said oscillatory signal, and a third winding magnetically coupled to at least one of said first and second windings to vary said magnetic coupling between said first and second windings in response to the conductive condition of said first switching means and thereby control operation of said oscillator.

20. The combination set forth in claim 19 wherein said detection circuit means is connected to said oscillator through rectifier circuit means poled to permit current flow therethrough in a forward direction from said detection circuit means to said oscillator and to block current flow therethrough in a reverse direction from said oscillator to said detection circuit means, said rectifier circuit means comprising bipolar junction transistor means having first and second main electrodes respectively connected to said detection circuit means and said oscillator, and a control electrode connected to one of said first and second electrodes such that the junction between said control electrode and the other of said first and second electrodes is poled to conduct current in said forward direction.

21. The combination set forth in claim 19 wherein said first switch means comprises a pair of thermal responsive contacts arranged to short said third winding.

22. In a refrigeration system, the combination comprising a refrigeration unit having a compressor driven by an AC motor, a battery which provides a source of DC power, inverter circuit means responsive to connection to said battery to supply first AC power to said motor from said battery, said inverter circuit means including rectifier means and a transformer having a primary winding connected in series with said rectifier means across said battery and having a secondary winding connected to said motor, AC power input means connected to said motor and to said secondary and adapted for connection to a source of second AC power so that when said AC power input means is connected to said AC source said second AC power is applied to said motor and to said secondary winding thereby inducing an AC signal in said primary, said rectifier means being arranged to rectify said induced AC signal and develop DC power for charging said battery, regulating means connected to said battery and responsive to the charge level thereof to provide a first signal, and switch means connected between said AC power input means and said transformer secondary and responsive to said first digital to place said second AC power across said secondary when said charge level of said battery is below a first predetermined level, said switch means comprising an electronic switch having a control electrode, and first and second main electrodes respectively electrically connected to said AC power input means and to said secondary winding, the conductive condition between said first and second electrodes being responsive to a triggering signal at said control electrode, and triggering means responsive to said first signal to provide said triggering signal when said charge level is below said first predetermined level.

23. The combination set forth in claim 22 wherein said triggering circuit means comprises an oscillator which is gated into an oscillating condition by said first signal to provide a series of triggering signals to said control electrode.

24. The combination set forth in claim 23 wherein said oscillator is transformer coupled to said control electrode.

25. In a refrigeration system, the combination comprising a refrigeration unit having a compressor driven by an AC motor, a battery which provides a source of DC power, inverter circuit means responsive to connection to said battery to supply first AC power to said motor from said battery, said inverter circuit means including rectifier means and a transformer having a primary winding connected in series with said rectifier means across said battery and having a secondary winding connected to said motor, AC power input means connected to said motor and to said secondary and adapted for connection to a source of second AC power so that when said AC power input means is connected to said AC source said second AC power is applied to said motor and to said secondary winding thereby inducing an AC signal in said primary, said rectifier means being arranged to rectify said induced AC signal and develop DC power for charging said battery, regulating means connected to said battery and responsive to the charge level thereof to provide a first signal, and switch means connected between said AC power input means and said transformer secondary and responsive to said first signal to place said second AC power across said secondary when said charge level of said battery is below a first predetermined level, said regulating means providing said first signal when said battery reaches said first predetermined minimum charge level and maintaining said first signal until said charge level rises to a second predetermined level higher than said first level.

26. The combination set forth in claim 25 wherein said DC power developed by said rectifying means for charging said battery comprises a series of rectified battery charging pulses, said regulating means comprises first and second voltage divider means connected in series across said battery to provide a second signal proportional to the charge level of said battery, means to provide said first signal in response to said second signal, charge storage means connected across one of said voltage divider means and responsive to said battery charging pulses to store charge during each of said battery charging pulses and to discharge said stored charge through said one of said voltage divider means between said battery charging pulses, means to provide a third signal proportional to said battery charge level minus said stored charge, and means to terminate said first signal when said third signal is equal to said second signal.

27. The combination set forth in claim 26 wherein said voltage divider means comprises first and second resistors connected in series across said battery, said charge storage means comprises a capacitor connected in shunt with said first resistor, and said second and third signal responsive means comprises an electronic switch having first and second main electrodes and a control electrode for controlling conduction through said main electrodes, and a voltage breakdown device connected between said control electrode and the junction of said first and second resistors, the conductive condition between said first and second electrodes being responsive to the conductive condition of said voltage breakdown device.

28. In a refrigeration system, the combination comprising a refrigeration unit having a compressor driven by an AC motor, a source of DC power, inverter circuit means responsive to connection to said DC power source to supply first AC power to said motor, AC power input means adapted for connection to a source of second AC power, first switch means having first and second switch positions, said first switch means selectively connecting said compressor motor directly to said inverter circuit means and to said AC power input means in said first and second switch positions respectively, second switch means operatively coupled to said first switch means, said second switch means connecting said DC power source to said inverter circuit means when said first switch means is in said first switch position, and sensing means electrically coupled to said AC power input means to sense connection thereof to said AC power source, said sensing means being in a first conductive condition when said AC power input means is disconnected from said AC power source and in a second conductive condition when said AC power input means is connected to said AC source, and wherein said first and second switch means are operatively connected to said sensing means such that said first and second switch means are in said first and third switch positions, respectively, when said sensing means is in said first condition and in said second and fourth switch positions, respectively, when said sensing means is in said second condition.

29. The combination set forth in claim 28 wherein said sensing means comprises a relay coil and wherein said first and second switch means comprise first and second relay contact sets, respectively.

30. The combination set forth in claim 28 wherein said inverter circuit means includes reactive output coupling means electrically isolating said inverter circuit means against direct electrical conduction between said inverter circuit means and said AC power input means and against direct electrical conduction between said inverter circuit means and said compressor motor.

31. The combination set forth in claim 30 further comprising means electrically connected to said AC power input means and responsive to said second AC power to provide a series of pulses suitable for charging said battery, means electrically isolating said battery charging means against direct electrical conduction between said battery charging means and said AC power input means and against direct electrical conduction between said battery charging means and said motor.

32. In a refrigeration system, the combination comprising a refrigeration unit having a compressor driven by an AC motor, a source of DC power, inverter circuit means responsive to connection to said DC power source to supply first AC power to said motor, AC power input means adapted for connection to a source of second AC power, said inverter circuit means including reactive output coupling means electrically isolating said inverter circuit means against direct electrical conduction between said inverter circuit means and said AC power input means and against direct electrical conduction between said inverter circuit means and said compressor motor, first switch means having first and second switch positions, said first switch means selectively connecting said compressor motor to said inverter circuit means and to said AC power input means in said first and second switch positions, respectively, second switch means operatively coupled to said first switch means, said second switch means connecting said DC power source to said inverter circuit means when said first switch means is in said first switch position, and third switch means responsive to a predetermined condition of said refrigeration unit to remove power from said compressor motor regardless of the switch positions of said first and second switch means, said third switch means including reactive coupling means electrically isolating said third switch means against direct electrical conduction between said third switch means and said source of AC power and against direct electrical conduction between said third switch means and said motor.

* * * * *